United States Patent [19]

McCoy et al.

[11] Patent Number: 5,649,116

[45] Date of Patent: Jul. 15, 1997

[54] INTEGRATED DECISION MANAGEMENT SYSTEM

[75] Inventors: Randal A. McCoy, Sugar Hill; Beverly Kennedy, Alpharetta, both of Ga.

[73] Assignee: Servantis Systems, Inc., Norcross, Ga.

[21] Appl. No.: 415,231

[22] Filed: Mar. 30, 1995

[51] Int. Cl.⁶ .................................................. G06G 7/52
[52] U.S. Cl. ............................................................ 395/238
[58] Field of Search ...................................... 364/408, 401; 235/380, 419

[56] References Cited

U.S. PATENT DOCUMENTS

| | | | |
|---|---|---|---|
| 3,697,693 | 10/1972 | Deschenes et al. | 179/2 DP |
| 4,114,027 | 9/1978 | Slater et al. | 235/419 |
| 4,346,442 | 8/1982 | Musmanno | 364/408 |
| 4,812,628 | 3/1989 | Boston et al. | 235/380 |
| 4,823,264 | 4/1989 | Deming | 364/408 |
| 4,953,085 | 8/1990 | Atkins | 364/408 |
| 5,231,569 | 7/1993 | Myatt et al. | 364/408 |
| 5,262,942 | 11/1993 | Earle | 364/408 |
| 5,375,055 | 12/1994 | Togher et al. | 364/408 |
| 5,383,113 | 1/1995 | Kight et al. | 364/401 |

OTHER PUBLICATIONS

McAndrews, "The Automated Clearinghouse System: Moving Toward Electronic Payment," Business Review, Jul., 1994, pp. 15–23.

Monks, "Daylight Overdraft Fees will Force Users to Seek Alternatives", Global Investor, Feb., 1994, pp. 38–40.

McClure, "Taking the Risk out of Transactions," Security Management, Mar., 1994 pp. 23A–24A.

Primary Examiner—Kevin J. Teska
Assistant Examiner—Stephen J. Wolder, Jr.
Attorney, Agent, or Firm—Needle & Rosenberg, P.C.

[57] ABSTRACT

A computer-based system for managing risk among a plurality of accounts, each account having an associated account exposure, has a means for submitting a transaction to a selected account of a plurality of related accounts and a monitoring means, responsive to the submitting means, for determining a combined exposure of the plurality of related accounts associated with the selected account that would result from the submission of a transaction. A means, responsive to the monitoring means, is provided for authorizing the transaction when the combined exposure determined by the monitoring means is less than a first predetermined limit and for denying a submitted transaction when the combined exposure would exceed the first predetermined limit if the transaction were to be authorized. A means is provided for alerting a first officer when the combined exposure determined by the monitoring means would exceed a second predetermined limit if the transaction were to be authorized. A means is also provided for receiving from the first officer an authorization indicia to the authorizing means and for causing, upon the authorizing means receiving the indicia, the authorizing means to authorize a previously denied transaction. Means are also provided to assess charges for the use of daylight overdraft funds.

44 Claims, 7 Drawing Sheets

INTEGRATED DECISION MANAGEMENT SYSTEM

REFERENCE TO A MICROFICHE APPENDIX

A microfiche appendix, comprising a flowchart listing of the computer program implemented in the present invention, is included in the application.

BACKGROUND OF THE INVENTION

1. Field of the Invention

The present invention relates to financial business systems and, more specifically, to data processing apparatus for controlling risk in a multiple account system.

2. Description of the Prior Art

Currently, risk in the banking industry is controlled in an ad hoc fashion on an account-by-account basis. The fundamental element of risk is exposure, the amount of funds disbursed by the bank in excess of the funds held by the bank for a given account or group of accounts. When a bank receives a request for a transaction from a corporate customer, the bank's computer system examines the account to which the resulting transaction would be posted, if allowed, and determines if the exposure resulting from the transaction would exceed a predetermined exposure limit for that account. If the exposure limit would be exceeded, the computer system alerts an account officer who then decides whether to authorize the transaction. The officer's decision may be based on several factors, including past experience with the customer, an understanding of the context of the transaction request and a knowledge of the customer's other accounts.

If the officer desires knowledge of the customer's other accounts, he or she must access each of the accounts individually and tally up the balances (and exposures) for each account. While the officer is deciding whether to authorize the transaction, new transactions may be received by these other accounts, thereby changing the overall exposure of the customer and causing the officer's decision to be based on obsolete information.

Furthermore, banks usually assign exposure limits to each account on an individual basis. If a customer's overall exposure is relatively low, yet the exposure limit for one of its accounts is exceeded, the bank might deny a requested transaction to that account. In this situation, the bank's risk in otherwise allowing the transaction would be relatively low, yet the bank would lose the profits it would have made on the transaction and would also lose the goodwill of the customer. Therefore, with some customers it is desirable to assign relatively high exposure limits for the customer's individual accounts and an overall exposure limit for all of the customer's accounts taken together that is less than the sum of the exposure limits for each individual account. In this way, a customer could request a transaction that would increase the exposure to one account beyond the ordinary exposure limit for that account, yet the transaction could still be authorized if the overall exposure limit were not exceeded.

Implementing such a system on an ad hoc basis would be difficult, however, because corporate customers frequently maintain several, even hundreds, of accounts with a given bank. The amount of work involved for an account officer to tally the customer's total exposure is overwhelming and the risk of making costly mistakes, either to the bank or to the customer, would make such a system difficult.

It is also useful for banks to be able to track exposure and other conditions in groups of accounts in order to spot fraud and to identify industry trends. If apparently normal sums are withdrawn from many accounts belonging to a customer by the same type of payment system, it may indicate that the individual is involved in embezzlement or some other type of fraud. Similarly, if several customers in a single industry request similar transactions at the same time, it might indicate an important industry trend that could affect the bank. Tracking groups of accounts to spot these trends is almost impossible if done on an ad hoc basis, and no system currently provides an automatic means for tracking these types of trends.

Also, because of recent changes in Federal banking regulations, banks need to have the ability to assess charges for the use of daylight overdraft (DOD) funds. DOD funds are funds used by a customer in excess of funds in the account during a given banking day. Typical corporate customers use daylight overdraft funds to allow them to carry on business without having to keep a large amount of inactive funds on hand at a bank to cover all of the transactions that may occur during a single day. The corporation will essentially borrow DOD funds and provide funds to cover the DOD usage by the end of the day. Currently, because of the difficulty of tracking DOD usage, banks are unable to assess charges for DOD usage.

Many types of transactions occur throughout the processing day where the transaction is known at a given time, but does not become effective until a later time. This is known as a value dated transaction (VDT) because the transaction has no financial value to the target account until the time specified. One example of a VDT is a direct deposit payroll transaction, where the transaction is reported to the bank prior to the settlement of the transaction. Currently, many banks will process VDT's upon receipt, posting funds to the account prior to settlement. This situation ties up bank funds in an unproductive waiting cycle. Furthermore, even if the bank does not process VDT's upon receipt, it would be useful to the bank to track the projected exposure caused by the VDT prior to the actual settlement of the transaction.

U.S. Pat. No. 4,346,442, issued to Musmanno, discloses a data processing system for securities brokerage and cash management that supervises, implements and coordinates a margin securities brokerage account, short term money market funds and subscriber-initiated use of electronically responsive credit/debit media and checking systems. Subscriber expenditures, effected as by charge card use, check and cash advance, are applied on a hierarchal basis against the subscriber's free credit balance, short term investment and the lendable equity of his securities account. On a periodic basis, received card charges, check, securities and deposit transactions for the ensemble of account participants are verified and employed to compute an updated credit limit for each subscriber. The transactional data is reviewed against predetermined norms to detect abuses. The short term investment position of each account is modified as necessary to permit money market or comparable earned yields on the account free credit cash balance.

U.S. Pat. No. 4,823,264, issued to Deming, discloses an electronic funds transfer system that assures that funds to be electronically transferred are actually present to be transferred. This is accomplished by sending both the debit side and the credit side of the transaction as described in automated clearing house records to a payor's financial institution or data processor and comparing both records to assure the funds are present before releasing the funds to a payee.

None of the above-described references disclose a system for controlling risk in the banking industry among related corporate accounts. Nor do they make any provision for charging for the use of daylight overdraft funds.

SUMMARY OF THE INVENTION

The present invention, known as the Integrated Decision Manager (IDM), overcomes the disadvantages of the prior art by tying together multiple accounts belonging to a relationship. Under IDM, a relationship is a grouping of accounts having common characteristics. For example, a customer relationship is a grouping of the accounts belonging to a single customer. Several relationships may also be brought together in a group. For example, an industry group could comprise all of the customer relationships associated with customers belonging to the same industry. By grouping several accounts into a single relationship, a bank is able to make decisions by looking at the activity of a relationship as a whole, rather than by looking at the activity among individual accounts.

The key to managing groups under IDM is a series of profiles used to interrelate accounts and individuals. A customer relationship, which includes all of the accounts belonging to a single customer, is indexed in a relationship profile. A customer relationship profile typically lists all of the account numbers belonging to the customer, an identification of the bank's officer responsible for the customer's accounts and a listing of any exposure limits to be applied to the customer. A group relationship, which includes all of the accounts belonging to a predetermined group (such as an industry), is indexed in a group profile. The group profile typically identifies the customer profiles belonging to a group, the officer responsible for tracking the group and a listing of any exposure limits to be applied to the group. The profile maintenance system allows the creation and maintenance of these profiles and interfaces with the bank's customer information file (CIF) system, to allow for easy updating of the profiles to which a customer is assigned.

IDM is a system, operable on a bank's computer interconnected with various transaction requesting devices for managing a plurality of accounts, wherein each account has an associated account exposure. The system comprises a means for submitting a transaction for application to a selected account of a plurality of related accounts, and a monitoring means, responsive to the submitting means, for determining a combined exposure of the plurality of related accounts associated with the selected account that would result from the submission of a transaction. A means, responsive to the monitoring means, is provided for authorizing the transaction when the combined exposure determined by the monitoring means is less than a first predetermined limit and for denying a submitted transaction when the combined exposure would exceed the first predetermined limit if the transaction were to be authorized. A means, responsive to the monitoring means, is provided for alerting a first officer when the combined exposure determined by the monitoring means would exceed a second predetermined limit if the transaction were to be authorized. A means is also provided for receiving from the first officer an authorization indicia to the authorizing means and for causing, upon the authorizing means receiving the indicia, the authorizing means to authorize a previously denied transaction.

The submitting means (or payment source) may comprise several devices, such as a wire transfer connection, an automatic teller machine, a connection to an automated clearing house (ACH), an electronic check capture system, or an electronic cash management system. Other means for submitting transactions could include a teller system or a securities system. Similarly, the alerting means could also comprise several devices, including a video computer terminal communicating with the computer, a printing terminal, a telephone voice response system, or a facsimile machine capable of receiving input from the computer.

A bank may want to be able to detect a situation which is evidenced by several conditions occurring close together or from a single payment source. One reason for doing this is to prevent fraud. For example, the situation in which a single individual requests several transactions from different accounts of a single corporation, where each transaction would move large sums of money to a single location, might indicate that the individual is attempting to embezzle funds. Furthermore, the bank might want to track trends in an entire industry. For example, if a bank were to notice several large steel producers taking on higher than normal levels of exposure, it might indicate problems in the steel industry that would require the bank's special attention. Therefore, the present invention has a means for detecting the occurrence of a predetermined set of conditions in a plurality of related accounts and a means for alerting an officer when such conditions occur.

The system also provides a means for a bank to monitor the usage of daylight overdraft funds. The monitoring means comprises a computer programmed to determine an amount of time during which an account uses daylight overdraft funds, access a schedule of charges for daylight overdraft usage, and post a charge found in the schedule to the account corresponding to the amount of time the account uses daylight overdraft funds.

Typically, when a transaction request is received for an account, the system accesses an account table and determines if the account is listed in the account table. If the account is listed in the account table, a customer profile will be associated with the listed account number. The customer profile comprises a listing of all of the accounts belonging to an account relationship, an identification of a primary officer responsible for the relationship and a plurality of exposure limits associated with the relationship. The exposure limit is a preset limit determined by a bank officer responsible for the account.

The computer balances each account and determines the exposure for each account belonging to the relationship. The computer also determines the total exposure for the relationship by adding all of the exposures for each account belonging to the relationship. When the total exposure of the relationship exceeds the exposure limit, the computer notifies the primary officer of the problem.

The system can have more than one limit. For example, a "warning" limit and an "alert" limit may be used. In this case, the system notifies the relationship's primary officer when the total exposure of a relationship has reached the warning limit. When the total exposure exceeds the alert limit, the system notifies the primary officer and denies the requested transaction.

Even though the system denies a transaction, the denial can be overridden by an officer of the bank who instructs the system to authorize the transaction. In this case, the system will access a series of profiles listing the associated authorization limits of a hierarchy of bank officers and determine which officer in the hierarchy has the authority to authorize the transaction. If the exposure generated by the transaction would exceed the one officer's authorization limit, the authorization limit being the amount of exposure the officer is allowed to authorize, the system will continue to deny the transaction and notify a secondary officer. The secondary officer is an officer having an authorization limit immediately above that of the next lower officer. The secondary officer would then decide whether or not to authorize the transaction.

Rather than denying a transaction that would cause a relationship to exceed its alert limit, the bank may decide to stage a transaction. When the bank stages a transaction, it holds onto the transaction while waiting for the exposure to be lowered below the alert limit. The events that would cause this include receipt of additional funds, correction of an improperly reported transaction and adding a new asset account to the relationship. If sufficient funds are received by accounts within the relationship by the end of the banking day, the system will authorize the transaction. If additional funds are not received by the end of the banking day, the transaction is denied and must be resubmitted at a later time. The primary officer can also instruct the system to notify the officer when funds arrive, rather than automatically authorizing the transaction, thus allowing the officer to decide whether to authorize a previously staged transaction.

IDM also has the ability to track DOD usage. When an account in a relationship uses DOD funds, IDM accesses a relationship profile to determine which DOD usage fee schedule to base DOD usage charges on. It also tracks the amount of time and total funds used and then assesses the account a DOD usage charge based on time, amount and the DOD usage schedule that applies to the account. Occasionally, a customer settles DOD usage through a physical transfer of funds (i.e., pays a teller directly) or the DOD usage is settled manually and entered into the system at a later time. This is called an "arrears settlement," indicating that the transaction settled prior to its receipt by IDM. IDM has the ability to include arrears settlement data in its assessment of DOD usage charges as if the transaction were received at the settlement time, so that DOD funds usage is tracked accurately within the system.

In the case of VDT's, IDM becomes aware of the transaction as soon as the transaction is known and tracks its effect on the relationship's exposure. Furthermore, IDM has the ability post funds for use in a VDT at the actual time of settlement, rather than at the time of receipt.

It is an object of the present invention to control risk in the banking industry by making decisions based on groupings of accounts.

It is also an object of the present invention to automatically assess usage charges for the use of daylight overdraft funds.

These and other objects will become apparent from the following description of the preferred embodiments taken in conjunction with the following drawings, although variations and modifications may be effected without departing from the spirit and scope of the novel concepts of the disclosure.

DETAILED DESCRIPTION OF THE PREFERRED EMBODIMENTS

The invention is now described in detail. Referring to the drawings, like numbers indicate like parts throughout the views.

Figure 1:
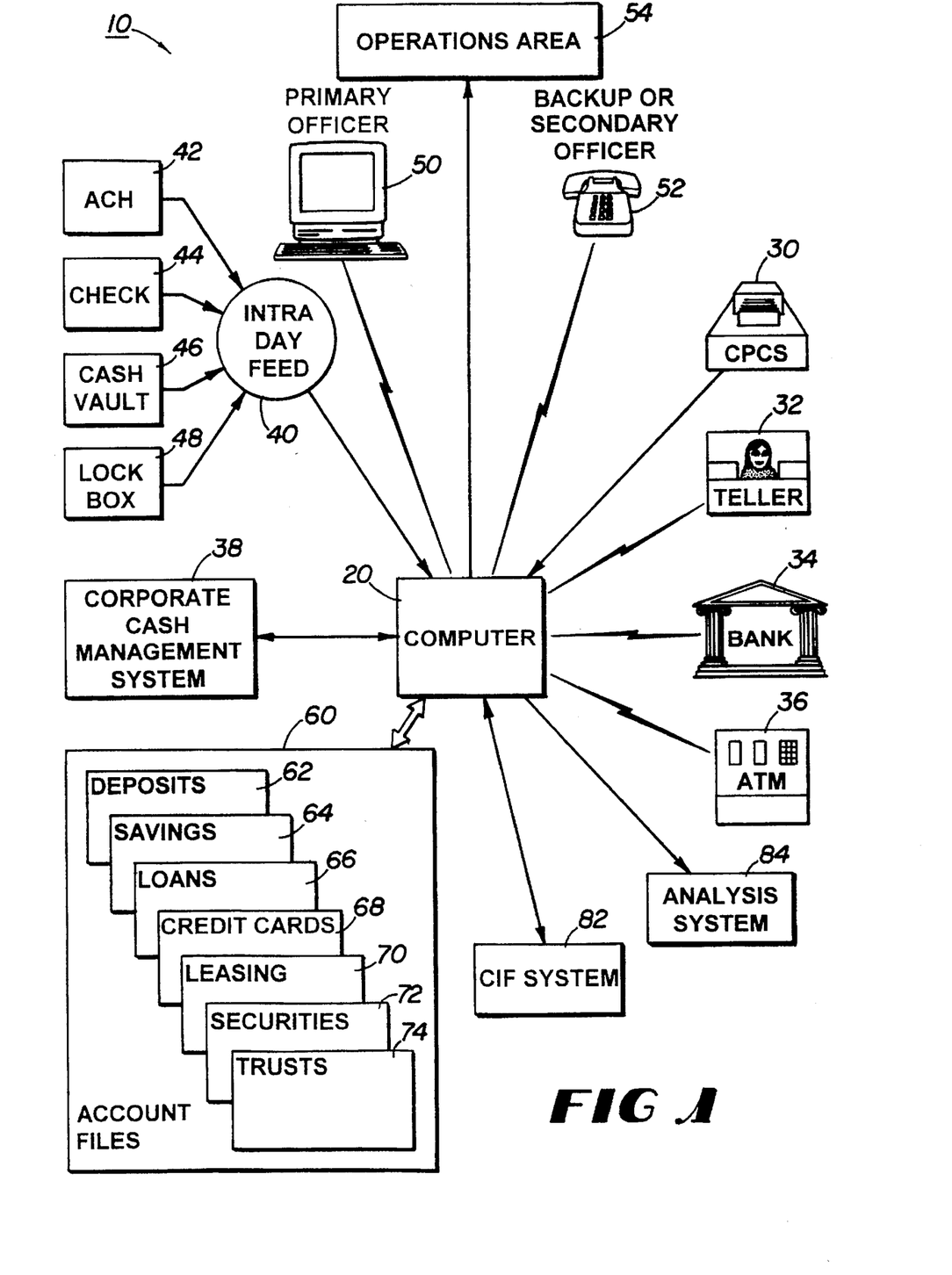
FIG. 1 is a schematic representation of the present invention showing the interrelationship between the various elements.

As shown in FIG. 1, the present invention 10 comprises a bank's computer 20 interconnected with several banking transaction enabling devices. These devices operate as means for submitting a transaction to a selected account and may include: a check processing and capture system 30 (such as an IBM CPCS system), an input terminal for tellers 32, a wire transfer system 34 electronically connected to the system, automatic teller machines 36 electronically connected to the system, and a corporate cash management system 38 electronically connected to the system. The computer 20 is also interconnected with a bank's intra-day feed process 40. This system receives inputs from such activities as an automated clearing house (ACH) connection 42, a checking system 44, a cash vault 46 and a lock box 48.

In order to alert the appropriate officers at the bank of important account-related events (such as a predetermined limit being exceeded), the computer 20 is connected to alerting means, such as a primary officer's video terminal 50 and a secondary officer's (or a backup officer's) telephone voice response unit 52. Rather than alerting the officers through video terminals, any means of enabling a computer to alert an officer could be used. Other such means include: electronic connections to phone-mail systems, printers and facsimile machines. A connection is also provided to generally alert the bank's operations area 54 of any significant events.

In order to monitor a plurality of associated accounts, the computer 20 has access to the various account files 60 containing information on the accounts. Such accounts may include deposit accounts 62, savings accounts 64, loan accounts 66, credit card accounts 68, leasing accounts 70, securities accounts 72 and trust accounts 74, or any other type of account the bank typically handles.

In order to maintain information on the related accounts, the computer 20 interfaces with the bank's existing customer information file (CIF) system 82, which maintains such information as the current mailing addresses of each account with the bank. The CIF system 80 may also provide information as to how different accounts are related to each other. The present invention 10 uses the CIF system to synchronize account relationships with the system. The computer 20 is also connected to the bank's analysis system 84.

Figure 2:
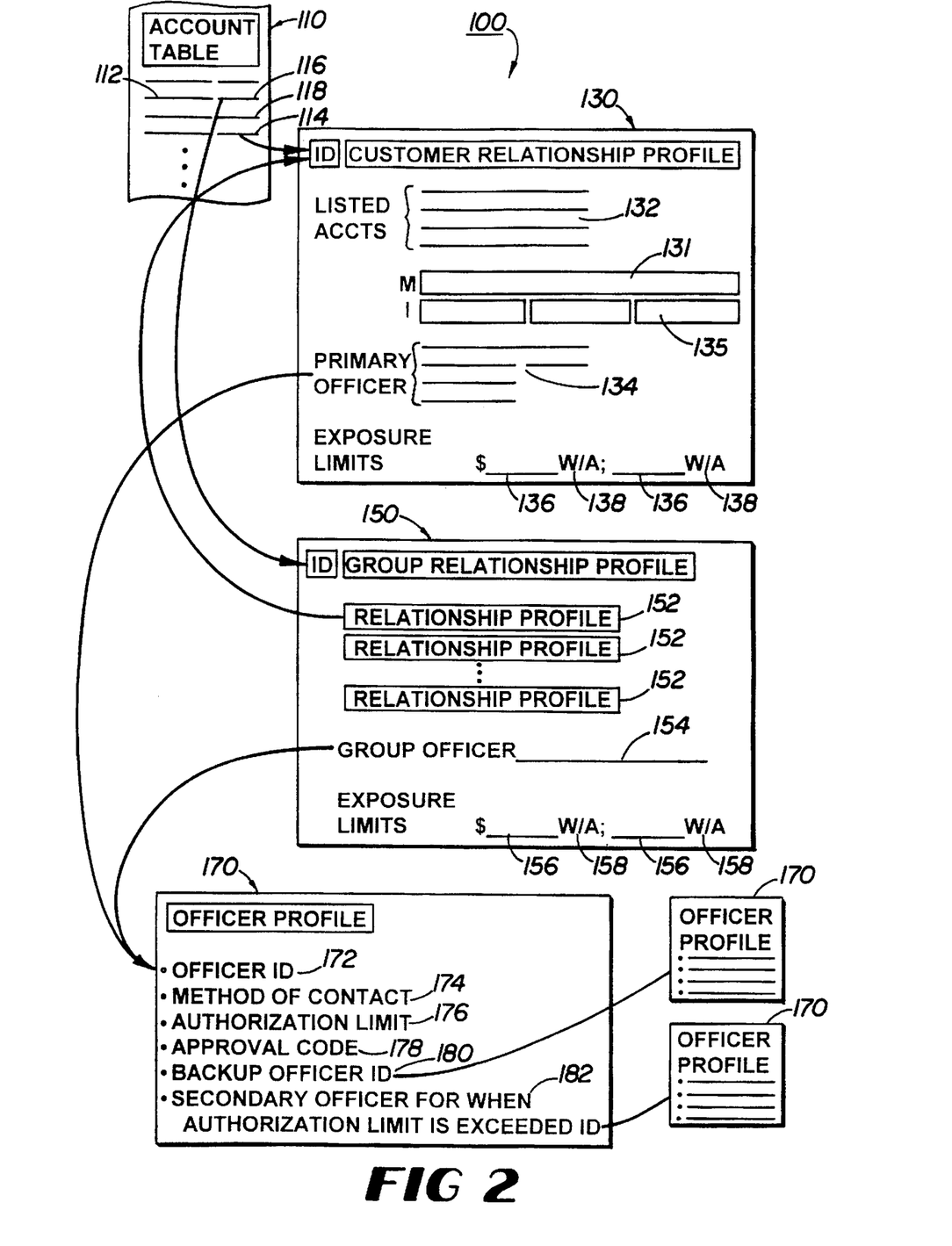
FIG. 2 is a schematic block representation of the profiles used in the present invention.

As shown in FIG. 2, in order to manage exposure among a plurality of related accounts, when a transaction to a particular account is received by the bank, the computer (item 20 in FIG. 1) accesses several files 100 profiling the relationships associated with the account. First accessed is an account table 110. The account table 110 comprises a listing 112 of all the accounts belonging to the system and relationship pointers 114, corresponding to relationships to which accounts may belong, or group pointers 116, corresponding to groups of relationships to which accounts may belong. Nonmember account numbers 118, corresponding to accounts not belonging to a relationship or a group, may also be listed in the account table 110.

If the account is listed in the account table 110, the customer relationship profile 130 and as many group relationship profiles 150 as the customer is a member of and pointed to in the account table 110 are accessed. The relationship profile 130 comprises an account list 132 containing the account numbers of all accounts belonging to a relationship, an officer field 134 identifying the primary officer for the relationship pointing to an officer profile 170, and an exposure limit 136. Several exposure limits 136 may be included, along with a limit type indicator 138 that indicates whether the limit is a warning limit or an alert limit. A warning limit indicates that the relationship requires attention, but that the transaction may be allowed. An alert limit, on the other hand, indicates that the transaction must be denied until certain actions are taken by an officer of the bank or until exposure is electronically reduced in the case of a staged transaction.

The group profile 150 comprises a plurality of relationship pointers 152 that identify the relationship profiles 130 belonging to a group. The group profile 150 also comprises a group officer field 154 that identifies an officer of the bank having responsibility for the group of relationships listed in the group profile 150 and points to the officer profile 170 listing the group officer. Group exposure limits 156 and group limit type indicators 158 may also be included in the group profile 150.

The officer profile 170 identifies the officer pointed to by either the relationship profile 130 or the group profile 150. It comprises an officer identification 172 and method of contacting the officer 174. It contains an authorization limit field 176 indicating the maximum amount the listed officer is allowed to authorize. An approval code 178 acts as a personal identification number for the officer and is used to verify actions taken by the officer. The officer profile 170 also contains a backup officer identification 180, which is a pointer to another officer profile, that identifies the officer to be contacted when the primary officer does not respond to a transaction request within a predetermined period, or when the primary officer is known to be unavailable (e.g., the primary officer is on vacation). A secondary officer identification 182 is also provided to identify the officer profile to be accessed when the amount of the transaction exceeds the amount listed in the primary officer's authorization limit 176 field.

Figure 3:
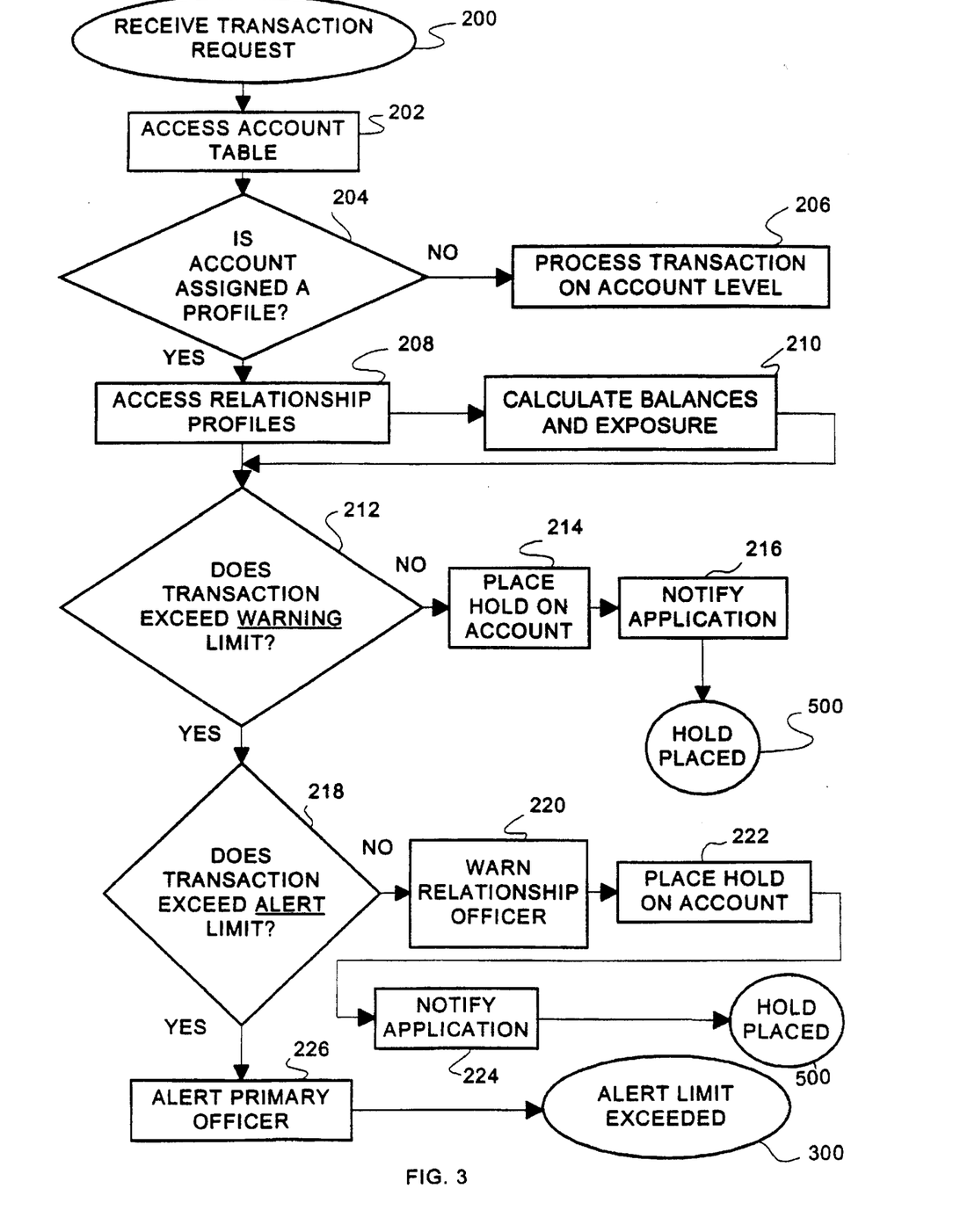
FIG. 3 is a schematic block representation of the actions performed by the present invention when a transaction request has been received.

Referring to FIG. 3, when the system receives a transaction request 200, it performs an account table access 202 and a test 204 to determine if the account for which the transaction is requested is assigned a relationship profile. If the account is not assigned to a relationship profile then the system goes to a routine 206 that processes the transaction on the individual account level, as transactions are conventionally processed. If the account is assigned to a relationship, the system performs a profile access 208 and performs a balance and exposure calculation 210 to determine the total exposure of the relationship. The balance and exposure calculation 210 involves determining the exposure for each account in the relationship and totalling the exposures for all of the accounts to determine the total exposure for the relationship. It will be obvious to those skilled in the art that the profile access 208 and the exposure calculation 210 may be performed in orders other than that describes above.

Next, the system performs a warning limit test 212 to determine whether the transaction would cause the total exposure of the relationship to exceed the predetermined warning limit for the relationship, as listed in the relationship profile (item 130 or 150 in FIG. 2). If the warning limit would not be exceeded, the system performs a hold routine 214 to reserve funds in the account in the amount of the transaction for the requesting application (i.e. the entity submitting the transaction) and then performs a notify routine 216 to notify the requesting application of the authorization for the transaction and executes a hold routine 500.

If the result of the warning limit test 212 is that the transaction would cause the total exposure of the relationship to exceed the warning limit, the system next performs an alert limit test 218 to determine whether the transaction would cause the total exposure of the relationship to exceed the predetermined alert limit. If the total exposure would not exceed the alert limit, the system performs a warn routine 220, notifying the primary relationship officer. Next, the system performs a hold routine 222 to reserve funds in the account in the amount of the transaction for the requesting application and then performs a notify routine 224 to notify the requesting application of the authorization for the transaction, and then executes a hold routine 500.

If the result of the alert limit test 218 is that the alert limit would be exceeded, the system performs an alert routine 226 to alert the primary relationship officer that the transaction has been denied and then proceeds to an alert limit exceeded routine 300 to handle the denied transaction.

Figure 4A:
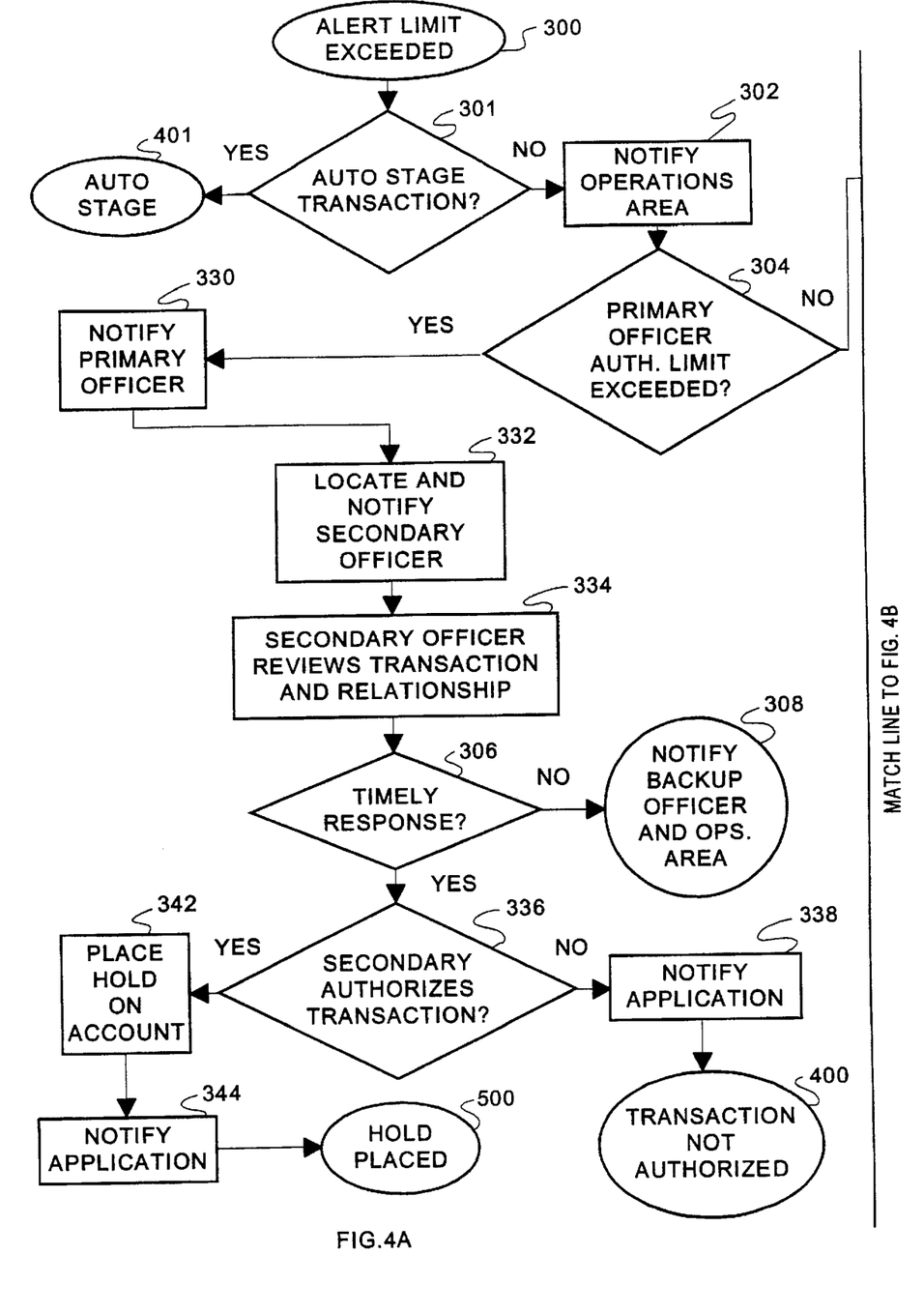
FIG. 4 is a schematic block representation of the actions performed by the present invention when an alert limit has been exceeded.
Figure 4B:
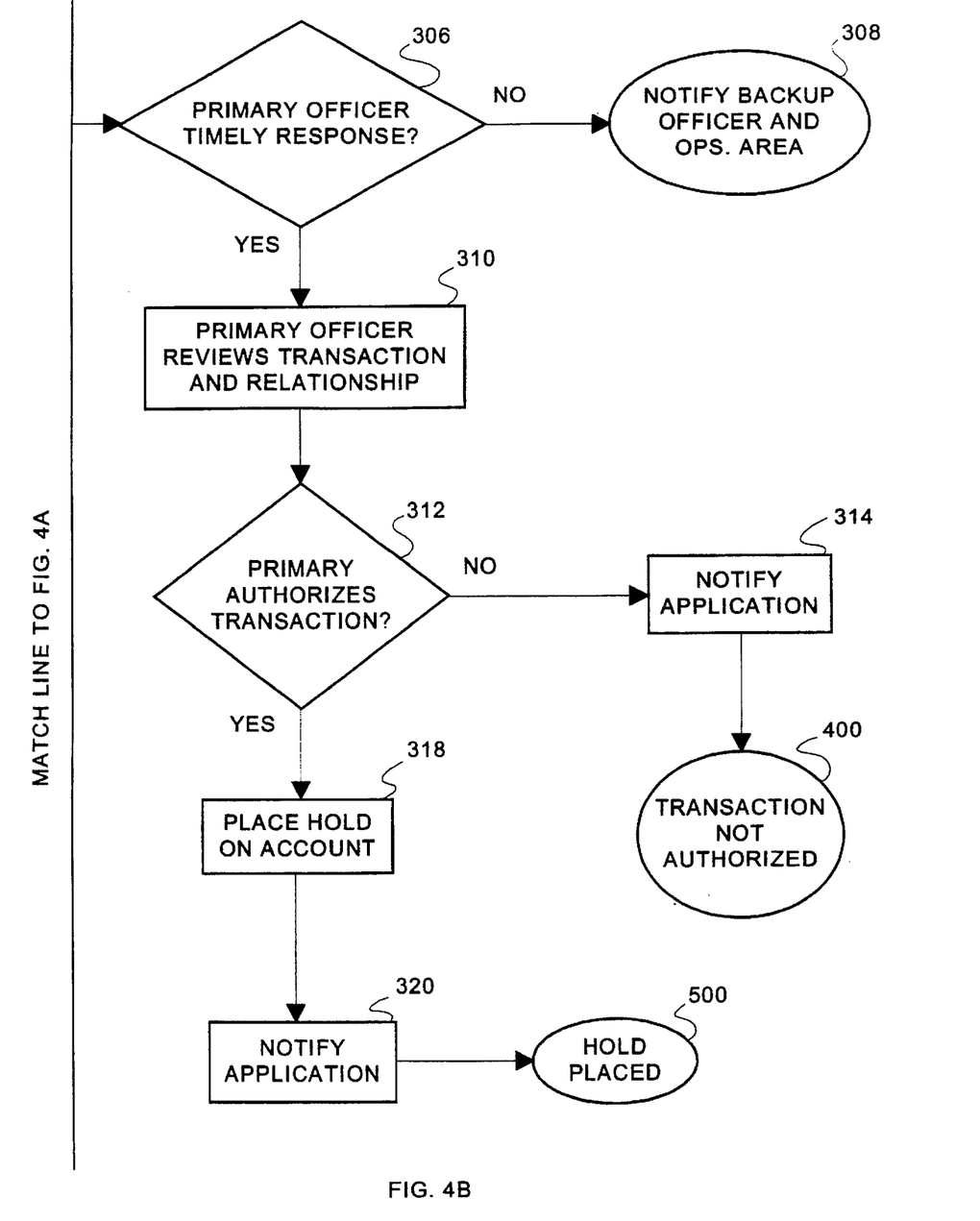

Referring now to FIG. 4, the alert limit exceeded routine 300, begins by performing an operations notification routine 302 to notify the primary officer and the bank's operation area responsible for the payment system originating the transaction that the relationship's alert limit has been exceeded. A primary officer limit exceeded test 304 is performed to determine whether the primary officer is authorized to allow an exposure increase in the amount requested by the transaction. If the primary officer's authorization limit has not been exceeded, the system waits for a timely response 306 from the primary officer. If a timely response 306 is not received from the primary officer, the system performs a notification routine 308 to notify the operations area and a backup officer. The backup officer is a bank officer having responsibilities similar to those of the primary officer and who can perform the same functions as the primary officer in the primary officer's absence. The system then treats the backup officer the same as the primary officer, subjected to the same conditions and responsibilities.

If the primary officer responds in a timely fashion, then the system will execute a wait sequence 310 while the primary officer reviews the transaction, the relationship and any other significant factors. The system has the ability to adjust the expected response time of the primary officer based on the analysis of several conditions. For example, because the Federal Reserve Bank has a 2:00 PM cut-off for all wire transfer transactions, the bank might want to allow a longer response time for wire transfer transactions earlier in the day and a shorter response time as it gets closer to 2:00 PM. Also the bank may set the response time for a backup officer to be less than that for a primary officer. Once the primary officer finishes reviewing the relationship, the system determines whether the primary officer has authorized the transaction 312. If the primary officer instructs the system not to authorize the transaction, the system performs a notification 314 to notify the application requesting the transaction and then executes a routine 400 to handle a transaction not being authorized. If the primary officer instructs the system to authorize the transaction, the system performs a hold routine 318 to place a hold on the account, performs a notification 320 to notify the application that the transaction has been authorized, and executes a hold placed routine 500.

If the result of the primary officer limit exceeded test 304 indicates that the transaction would exceed the primary officer's authorizing authority, the system performs a notify routine 330 to notify the primary officer. A locate and notify routine 332 to notify the secondary officer having a suitable authorization limit is also performed. The system executes a wait sequence 334 to allow the secondary officer to review the transaction and the relationship. Once the secondary officer finishes reviewing the relationship, the system determines whether the secondary officer has authorized the transaction 336. If the transaction has not been authorized, the system performs a notification 314 to notify the application requesting the transaction and then executes a routine 400 to handle a transaction not being authorized. If, on the other hand, the secondary officer authorizes the transaction, the system performs a hold routine 342 to place a hold on the account, performs a notification 344 to notify the application that the transaction has been authorized, and executes a hold placed routine 500.

Figure 5:
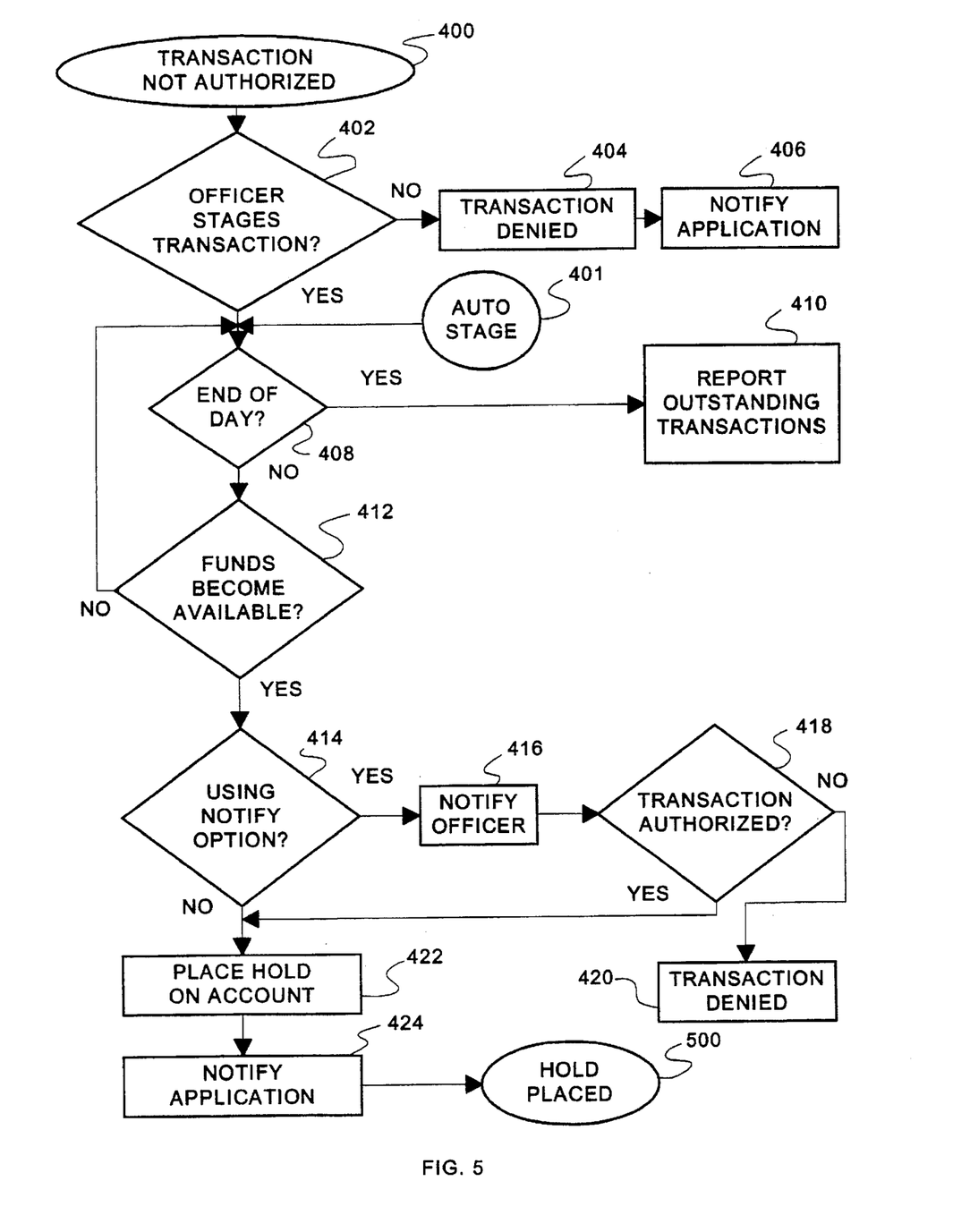
FIG. 5 is a schematic block representation of the actions performed by the present invention when a transaction is not initially authorized.

If a transaction is not authorized by an officer, the system executes a transaction not authorized routine 400, as shown in FIG. 5. This routine 400 allows the officer to stage a transaction so that it can be reconsidered if additional funds are received by the bank. Initially, the routine performs a test 402 to determine whether the officer has instructed the system to stage the transaction. If the officer instructs the system not to stage the transaction, a routine 404 to handle denied transactions is performed and a notify application routine 406 is performed.

If the officer instructs the system to stage the transaction, a routine 408 is executed to determine if funds become available before the end of the day. The system monitors the receipt of each event that could lower exposure and executes the event as soon as possible. If funds have not become available before the end of the day, the system performs a routine 410 to report the outstanding transaction. If, prior to the end of the day the system determines that sufficient funds become available 412, the system performs a test 414 to determine if the officer has instructed the system to await further instructions prior to authorizing the transaction. If the officer has chosen the await further instructions option, the system will execute a notify 416 to the officer and perform a test 418 to determine whether the officer has instructed the system to authorize the transaction. If the officer decides not to authorize the transaction, the system executes a transaction denied routine 420.

If the officer has instructed the system to authorize the transaction, or if the officer did not instruct the system to await authorizing instructions, the system will execute a routine 422 that places a hold on the account. The system then executes a notification routine 424 that notifies the application and the officer who staged the transaction that the transaction has been authorized.

Figure 6:
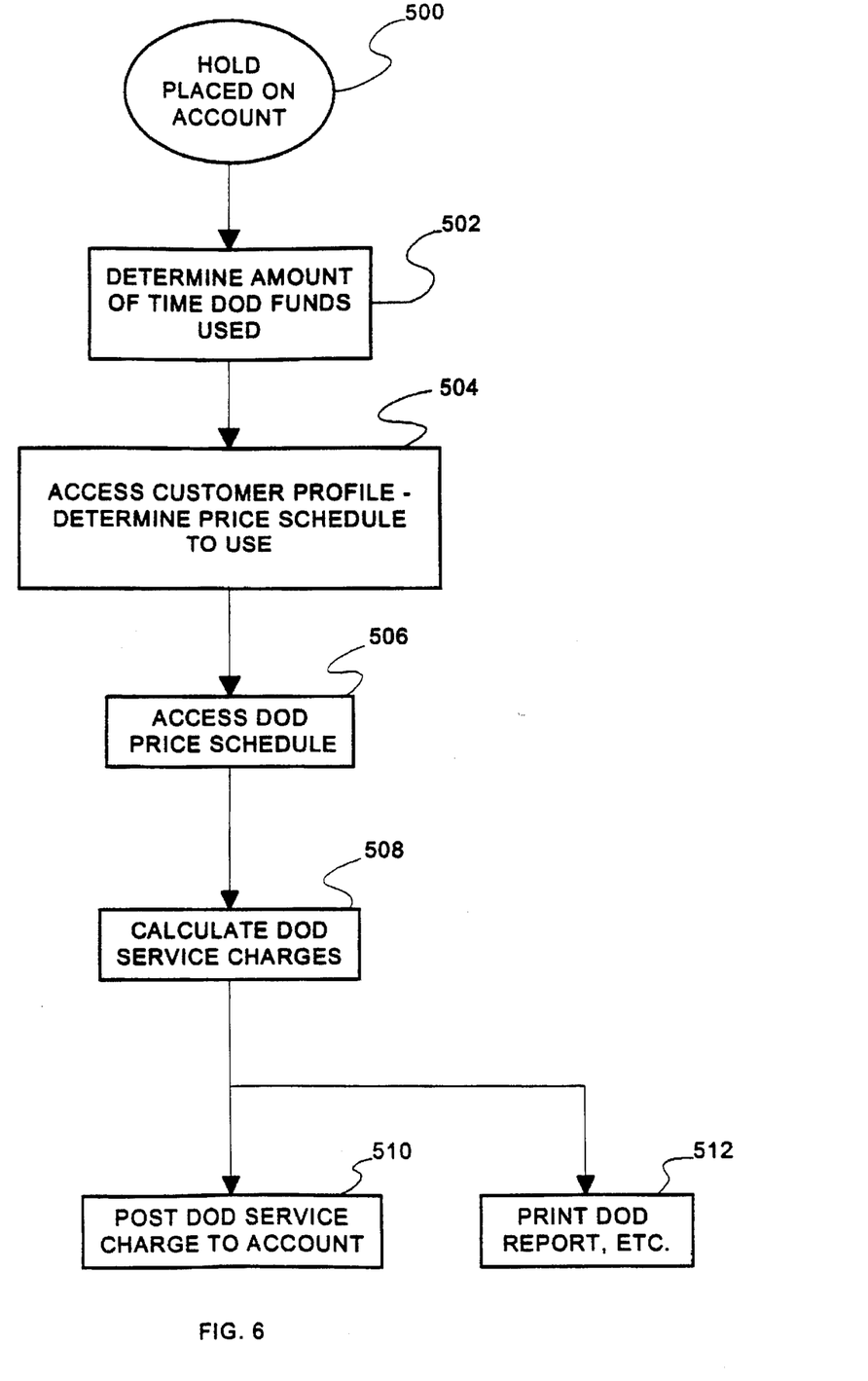
FIG. 6 is a schematic block representation of the daylight overdraft system.

Referring to FIG. 6, when a customer uses funds, the system executes the hold routine 500. This routine executes a function 502 that determines the amount of DOD funds used, if any, and for how long. It then performs a customer profile access 504 to determine the pricing schedule to be used to determine DOD charges. Next, the system performs an access 506 of the DOD schedule listed in the customer profile and then performs a calculation 508 of the DOD service charges to be applied to the account. Finally, the system performs an operation 510, in which it indicates to the banks analysis system the amount of DOD service charge to be applied to the account, and it performs a maintenance operation 512, in which it performs maintenance operations, such as printing a DOD usage report, etc.

As would be obvious to one skilled in the art of computer system design, the execution order of many of the steps of the above-disclosed computer program could be changed without departing from the scope of this invention.

The above embodiments are given as illustrative examples and are not intended to impose any limitations on the invention. It will be readily appreciated that many deviations may be made from the specific embodiments disclosed in this specification without departing from the invention. Accordingly it is intended to cover all such modifications as within the scope of this invention.

What is claimed is:

1. A system for managing a plurality of accounts, each account having an associated account exposure, comprising:
   a. means for submitting a transaction for application to a selected account of a plurality of related accounts;
   b. monitoring means, responsive to said submitting means, for determining a combined exposure of said plurality of related accounts associated with the selected account that would result from the submission of a transaction;
   c. means, responsive to said monitoring means, for authorizing said transaction when the combined exposure determined by said monitoring means is less than a first predetermined limit and for denying a submitted transaction when the combined exposure would exceed said first predetermined limit if the transaction were to be authorized;
   d. means, responsive to said monitoring means, for alerting a first officer when the combined exposure determined by said monitoring means would exceed a second predetermined limit if the transaction were to be authorized; and
   e. means for receiving from said first officer an authorization indicia to said authorizing means and for causing, upon said authorizing means receiving said indicia, said authorizing means to authorize a previously denied transaction.

2. The system of claim 1 wherein said monitoring means comprises a computer programmed to calculate the combined exposure of said plurality of accounts from the individual account exposures.

3. The system of claim 1 wherein said submitting means comprises a wire transfer connection.

4. The system of claim 1 wherein said submitting means comprises an automatic teller machine.

5. The system of claim 1 wherein said submitting means comprises an automated clearing house system.

6. The system of claim 1 wherein said submitting means comprises an electronic check capture system.

7. The system of claim 1 wherein said submitting means comprises an electronic cash management system.

8. The system of claim 1 wherein said submitting means comprises a teller system.

9. The system of claim 1 wherein said submitting means comprises a securities system.

10. The system of claim 1 wherein said alerting means comprises a video terminal communicating with a computer.

11. The system of claim 1 wherein said alerting means comprises a printing terminal in communicating with a computer.

12. The system of claim 1 wherein said alerting means comprises a telephone communicating with a computer.

13. The system of claim 1 wherein said alerting means comprises a facsimile machine communicating with a computer.

14. The system of claim 1 further comprising means for detecting a predetermined set of conditions occurring in said plurality of related accounts and means for alerting said first officer when said predetermined set of conditions occurs.

15. The system of claim 1 further comprising means for monitoring usage of daylight overdraft funds comprising a computer programmed to:
   a. determine an amount of time during which an account uses daylight overdraft funds;
   b. access a schedule of charges for daylight overdraft usage; and
   c. post a charge found in said schedule to said account corresponding to said amount of time said account uses daylight overdraft funds.

16. A computer system for managing a plurality of relationships of related accounts, comprising:
   a. means for receiving a transaction request for an account;
   b. means, responsive to said receiving means, for accessing an account table and determining if the account is listed in the account table;
   c. means, responsive to said account table accessing means, for accessing a customer profile when the account is listed in the account table, the customer profile comprising a listing of all of the accounts belonging to a relationship, an identification of a primary officer and an exposure limit for relationship;
   d. calculating means for determining an exposure for each account belonging to the relationship and for determining a total exposure for the relationship, the total exposure of the relationship being the sum of the exposures for each account belonging to the relationship; and
   e. means, responsive to said calculating means, for notifying the primary officer when the total exposure exceeds the exposure limit.

17. The computer system of claim 16 further comprising means for denying the transaction when the total exposure exceeds the exposure limit until the primary officer transmits an authorization to allow the transaction.

18. The computer system of claim 16 further comprising:
   a. means for determining whether the total exposure exceeds an authorization limit associated with the primary officer; and
   b. means for notifying a secondary officer when the total exposure exceeds the exposure limit and the authorization limit.

19. The computer system of claim 18 further comprising means for denying the transaction when the total exposure exceeds the exposure limit and the authorization limit until the secondary officer transmits an authorization to allow the transaction.

20. The computer system of claim 16 further comprising means for denying the transaction when the total exposure exceeds the exposure limit until exposure has been reduced so that the total exposure limit is no longer exceeded.

21. The computer system of claim 20 wherein the exposure has been reduced by additional funds being received by an account in the relationship.

22. The computer system of claim 21 further comprising means for authorizing the transaction when the primary officer transmits an authorization to allow the transaction.

23. The computer system of claim 20 wherein the exposure has been reduced by the opening of a new asset account belonging to the relationship.

24. The computer system of claim 20 wherein the exposure has been reduced by the correction of an incorrectly reported transaction.

25. The computer system of claim 20 wherein the exposure has been reduced by modification of an exposure limit assigned to the relationship.

26. The computer system of claim 20 further comprising means for notifying the primary officer when additional funds become available to an account in the relationship so that the total exposure limit is no longer exceeded.

27. The computer system of claim 20 further comprising means for authorizing the transaction when additional funds become available to an account in the relationship so that the total exposure limit is no longer exceeded.

28. The computer system of claim 20, wherein the exposure has been reduced by deletion of a liability account belonging to the relationship.

29. The computer of claim 28 further programmed to perform the step of authorizing a previously denied transaction when additional funds become available to an account in a relationship so that said total exposure limit is no longer exceeded.

30. The computer of claim 28 further programmed to perform the following steps:
   a. determining whether the total exposure exceeds an authorization limit associated with the primary officer, and notifying a secondary officer when the total exposure exceeds the exposure limit and the authorization limit; and
   b. denying the transaction when the total exposure exceeds the exposure limit and the authorization limit until the secondary officer transmits an authorization to allow the transaction.

31. The system of claim 30 further comprising means for allowing said first officer to override said denying means, thereby authorizing said transaction.

32. The computer of claim 28 further programmed to perform the step of notifying the primary officer when additional funds become available to an account in a relationship to which a transaction had previously been denied, so that said total exposure limit is no longer exceeded.

33. The system of claim 32 system further comprising means for notifying a second officer when said transaction would cause said total exposure to exceed said first exposure limit unless said first officer responds to the system within a predetermined period after the transmittal of a notification of a denied transaction to said first officer.

34. The system of claim 32 wherein said first officer profile further comprises means for indicating an authorization limit for said first officer and said system further comprises means for notifying a third officer when said transaction would cause said total exposure to exceed said exposure limit by an amount equal to said authorization limit.

35. The system of claim 34 wherein said determining means maintains a file identifying all of the accounts in a relationship.

36. A system for managing the total exposure of a plurality of relationships, each having a plurality of accounts, comprising:
   a. means for maintaining a relationship profile comprising:
      i. identification of the accounts belonging to the relationship;
      ii. identification of a first officer having initial responsibility for the relationship; and
      iii. indication of a first exposure limit for the relationship;

b. means for maintaining a first officer profile comprising information necessary for contacting said first officer;

c. means for processing a requested transaction to a selected account identified in said relationship profile;

d. means for accessing said relationship profile and said processing means to monitor said total exposure of said relationship; and e. means for accessing said first officer profile and transmitting a notification to said first officer when said transaction would cause said total exposure to exceed said first exposure limit.

37. A computer for managing a plurality of relationships of related accounts, programmed to perform the following steps:

a. receiving a transaction request for an account;

b. accessing an account table and determining if the account is listed in the account table;

c. accessing a relationship profile when the account is listed in the account table, the relationship profile comprising a listing of all of the accounts belonging to a relationship of related accounts, an identification of a primary officer and an exposure limit for the relationship;

d. determining an exposure for each account belonging to the relationship and determining a total exposure for the relationship, the total exposure of the relationship being the sum of the exposures for each account belonging to the relationship;

e. notifying the primary officer when the total exposure exceeds the exposure limit; and f. denying the transaction when the total exposure exceeds the exposure limit until the primary officer transmits an authorization to allow the transaction.

38. The system of claim 37 further comprising means for determining if an account is a member of a relationship.

39. The system of claim 37 further comprising means for verifying actions of said first officer.

40. The system of claim 37 further comprising means for staging a transaction when said transaction would cause said total exposure to exceed said first exposure limit, wherein the system executes a predetermined action when funds posted to one of said accounts in said relationship cause reduces said total exposure below said first exposure limit.

41. The system of claim 37 further comprising means for denying said transaction when said transaction would cause said total exposure to exceed said first exposure limit.

42. The system of claim 41 wherein said predetermined action is authorizing said transaction.

43. The system of claim 41 wherein said predetermined action is notifying said first officer.

44. A system for managing a plurality of relationships of related accounts, comprising:

a. means for receiving a transaction request for a first account;

b. calculating means for determining an exposure for each account belonging to a relationship of accounts, the relationship comprising the first account, and for determining a total exposure for the relationship, the total exposure of the relationship being the sum of the exposures for each account belonging to the relationship;

c. means, responsive to said calculating means, for notifying a primary officer when the total exposure exceeds the exposure limit; and d. means for denying the transaction when the total exposure exceeds the exposure limit until the primary officer transmits an authorization to allow the transaction.

* * * * *